United States Patent [19]

Grattapaglia

[11] 4,286,695

[45] Sep. 1, 1981

[54] DEVICE FOR AUTOMATICALLY ADJUSTING BRAKE CLEARANCE, IN PARTICULAR FOR AN EARTH MOVING MACHINE

[75] Inventor: Giorgio Grattapaglia, Turin, Italy

[73] Assignee: Fiat-Allis Macchine Movimento Terra S.p.A., Lecce, Italy

[21] Appl. No.: 78,574

[22] Filed: Sep. 24, 1979

[30] Foreign Application Priority Data

Oct. 6, 1978 [IT] Italy .............................. 69320 A/78

[51] Int. Cl.³ .............................................. F16D 65/56
[52] U.S. Cl. ............................. 188/196 BA; 188/77 R
[58] Field of Search .......... 188/77 R, 196 BA, 196 D, 188/196 R

[56] References Cited

U.S. PATENT DOCUMENTS 3,473,632  10/1969  Kimura et al. ..................... 188/77 R
3,820,636   6/1974  Kass .......................... 188/196 BA X

*Primary Examiner*—Duane A. Reger
*Attorney, Agent, or Firm*—August E. Roehrig, Jr.; Robert A. Brown

[57] ABSTRACT

An adjustment device for automatically adjusting clearance between components of a brake mechanism including a movable member operable by a vehicle operator to move a braking member from a clearance position into contact with a rotating member. The adjustment device includes a threaded shaft having a portion operatively coupled to a tubular member by means of a clutch. As wear occurs in the brake mechanism, the clutch permits relative movement between the threaded shaft and the tubular member in a first direction of movement of the movable member, and transmits movement therebetween in a second direction of movement of the movable member to cause rotation of the threaded shaft and maintain a constant clearance.

13 Claims, 11 Drawing Figures

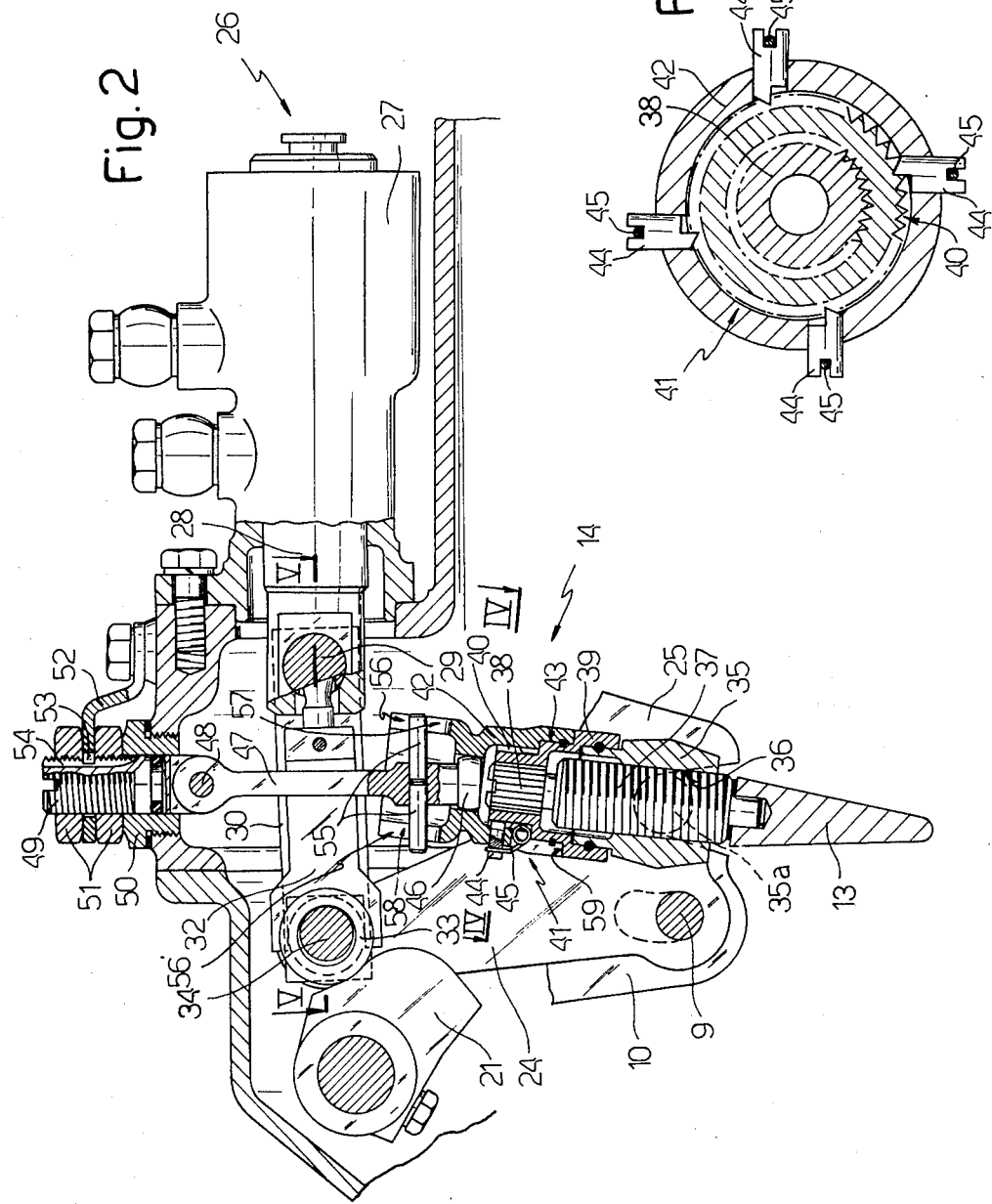

DEVICE FOR AUTOMATICALLY ADJUSTING BRAKE CLEARANCE, IN PARTICULAR FOR AN EARTH MOVING MACHINE

BACKGROUND OF THE INVENTION

This invention relates in general to brake mechanisms, and, in particular, to a device for automatically adjusting brake clearance of a brake mechanism.

More specifically, but without restriction to the particular use which is shown and described, this invention relates to a device for automatically adjusting a brake mechanism during operation to maintain a predetermined clearance between a braking member and a rotating member of the brake.

In the prior art, numerous types of brake mechanisms are employed in virtually every vehicle including, for example, the brakes utilized in an earth moving machine. Generally, such brakes may be in the form of a band brake, shoe brake, drum brake, and the like. In each of these types of known devices, a braking member and a rotating member are physically moved by an operator into frictional contact with each other from an initial separated or clearance position. This clearance distance between the members is subject to detrimental variation as wear on the braking components occurs during use of the braking system. Such alteration of the initial separation of the braking and rotating elements adversely interferes with the overall effectiveness of the braking system and continuous adjustment of clearance becomes necessary.

Several techniques have been employed in the prior art by which the initial clearance between the braking components can be adjusted so that a selected spacing is maintained in the braking system to avoid such undesired results. Such prior art adjustment devices have not been wholly satisfactory to maintain accurately a predetermined brake clearance to maximize both the braking capability and length of service of a brake mechanism such as employed in heavy duty uses in earth moving equipment. Known techniques either require manual adjustments while the machine is not operating or provide some degree of automatic adjustment during operation of the vehicle which has previously not been optimumly effective.

SUMMARY OF THE INVENTION

It is, therefore, an object of this invention to improve the adjustment of initial clearance between components of a brake mechanism.

Another object of this invention is to automatically maintain a constant clearance between braking components of a brake mechanism.

A further object of this invention is to accurately maintain a given clearance between componets of a braking mechanism during operation of the brake.

Still another object of this invention is to selectively vary the magnitude of the clearance to be automatically maintained.

These and other objects are attained in accordance with the present invention wherein there is provided an adjustment device for automatically adjusting clearance between components of a brake mechanism including a movable member operable by a vehicle operator to move a braking member from a clearance position into contact with a rotating member. The adjustment device includes a threaded shaft having a portion operatively coupled to a tubular member by means of a clutch. As wear occurs in the brake mechanism, the clutch permits relative movement between the threaded shaft and tubular member is a first direction of movement of the movable member, and transmits movement therebetween in a second direction of movement of the movable member to cause rotation of the threaded shaft and maintain a constant clearance.

DESCRIPION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 2 is an enlarged partial sectional view showing the clearance adjustment of the band brake of FIG. 1;

FIG. 4 is a sectional view taken along line 4—4 of FIG. 2;

DESCRIPTION OF A PREFERRED EMBODIMENT

For convenience of illustration without the intention of being so limited, the clearance adjustment device according to the invention is described with reference to a band brake as commonly utilized in earth moving machines. It should, however, be apparent to one skilled in the art that the clearance adjustment device herein described can be employed with suitable adaptation to any other type of brake mechanism such as shoe brakes, drum brakes, or the like.

Figure 1:
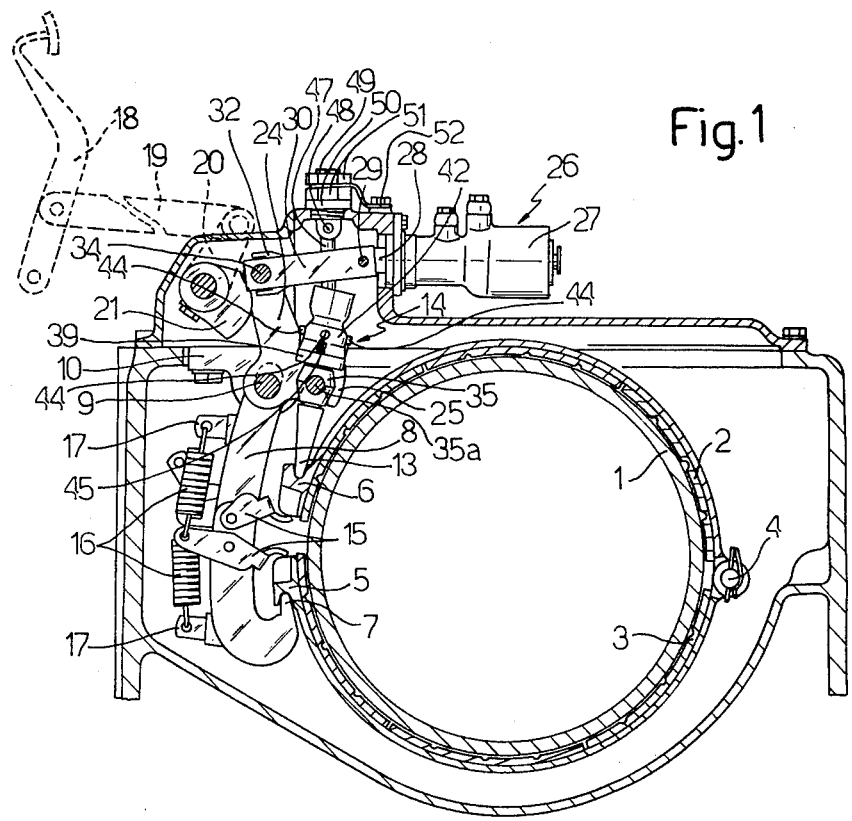
FIG. 1 is a vertical sectional view of a band brake for an earth moving vehicle, provided with the clearance adjustment device of the present invention.

Referring to FIG. 1, there is illustrated a band brake incorporating the teachings of the invention. The brake comprises generally a braking drum 1 surrounded by two portions of spaced brake bands 2 and 3, which are interconnected at one edge by a pin 4. The other edges of bands 2 and 3 include blocks 5 and 6 which are respectively affixed thereto by any convenient technique. Block 5 is attached to band 3 and is provided with a seat arranged to cooperate with a projection 7 of a lever 8, which is pivotally mounted by a pin 9 to a support 10 attached rigidly with the machine chassis. Block 6 of band 2 is provided with a seat arranged to cooperate with the end of a push rod 13, forming part of the clearance adjustment device of the invention and indicated overall by reference numeral 14. A pair of swivel-mounted brackets 15 maintain contact between each of the seats of block 5 and 6, projection 7, and the end of the push rod 13. Brackets 15 are provided with a flange which is urged against the blocks 5 and 6 by the action of a pair of corresponding springs 16, each of which is stretched between one end of its respective bracket 15 and a projection 17 on the lever 8.

The described brake is controlled by a pedal 18 which upon actuation rotates a cam 21 by means of a transmission comprising a lever 19 and crank 20, shown in phantom in FIG. 1. Upon rotation cam 21 acts in the manner to be described hereafter and causes a pair of swing levers 24 to rotate about the pin 9. The clearance adjustment device 14 is operatively positioned between arms 25 of levers 24 whereby swing levers 24 can be rotated either directly by cam 21, or by a conventional servo brake 26 disposed between the cam and lever 24.

Figure 5:
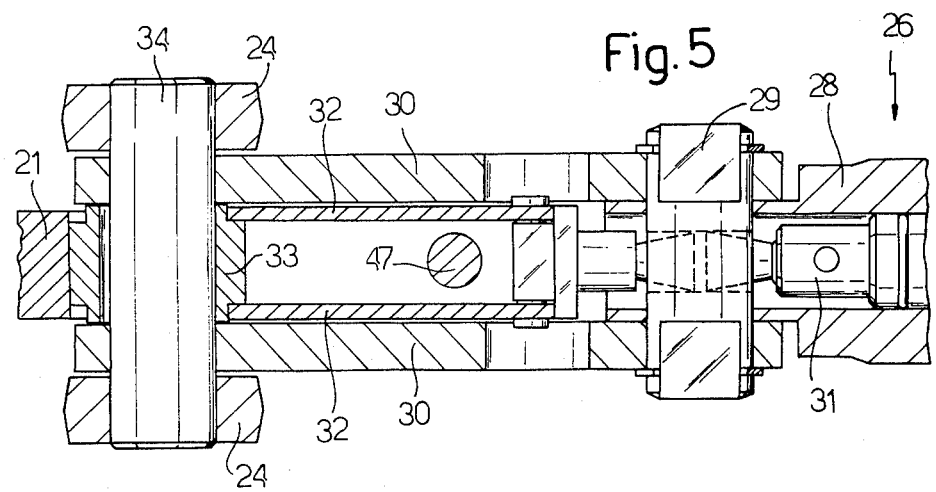
FIG. 5 is a sectional view taken along line 5—5 of FIG. 2.

As is apparent from FIGS. 2 and 5, the servo brake 26 includes a housing 27 in which an extension member 28 slides axially thereof. Extension member 28 is coupled by a pin 29 (FIG. 5) to a pair of plates 30, which are, in turn, pivotally mounted by another pin 34 to the upper ends of the levers 24, as can be clearly seen in FIG. 5. Selective actuation of the servo brake moves the extension member 28 and consequently the two plates 30 to the right viewing FIG. 2, to effect selective rotation of the levers 24 in a clockwise direction about pin 9.

The servo brake is activated by a push rod 31 which is axially slidable in the extension member 28, and is pivotally attached to a respective end of a pair of inner plates 32 disposed between plates 30. The other end of inner plates 32 is rigidly coupled to a bushing 33 having an outer surface which is arranged to bear against the contour of the cam 21. There exists a certain radial clearance, as shown in FIGS. 2 and 5, between the inner bore of bushing 33 and the outer surface of the pin 34. The servo brake is designed for activation during a first portion of the anti-clockwise rotation of the cam 21, which effects a small displacement of the bushing 33 (FIG. 5) relative to the pin 34, and therefore a subsequent movement of the push rod 31 toward the right in FIG. 5. In the known manner, this movement establishes the displacement of the extension member 28 toward the right, to cause the levers 24 to rotate clockwise.

Figure 3:
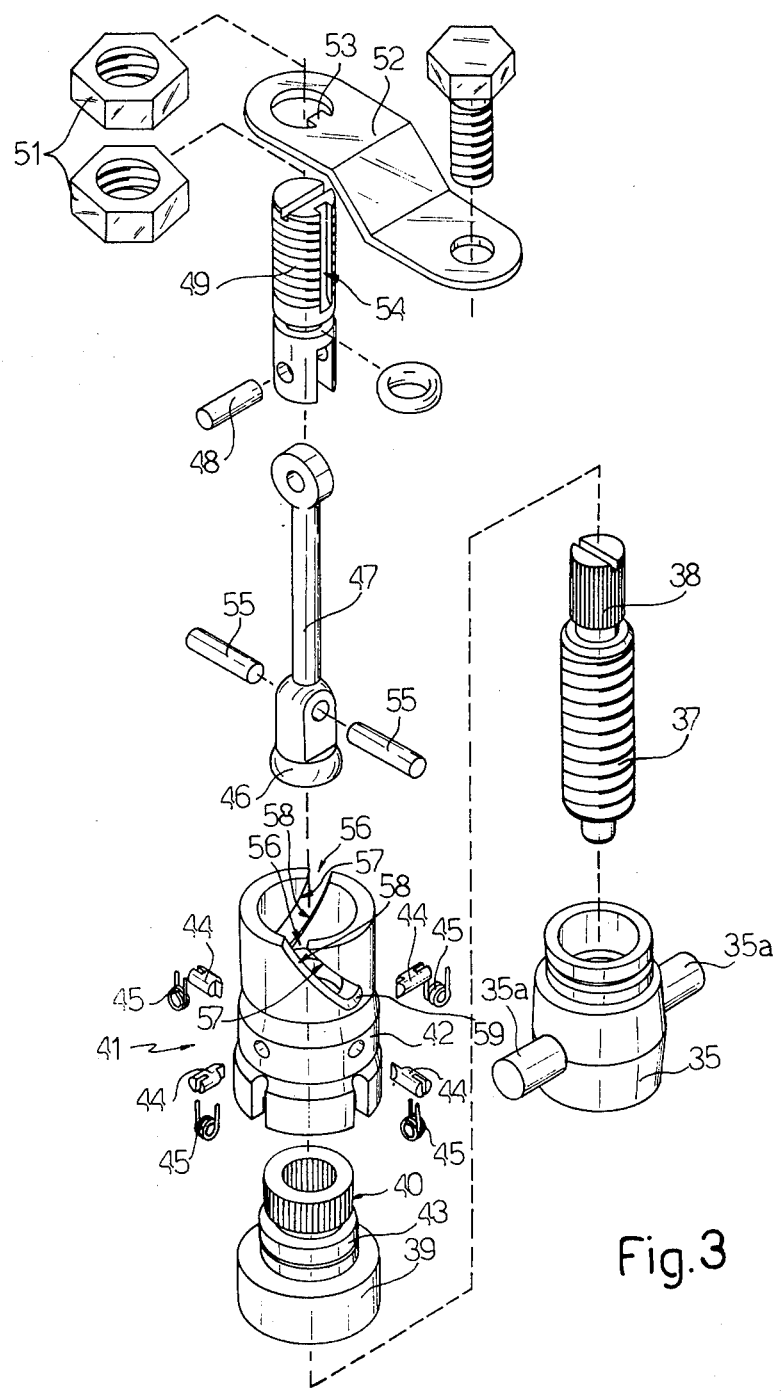
FIG. 3 is an exploded perspective view of the clearance adjustment device of the band brake of FIGS. 1 and 2.

The adjustment device according to the invention, indicated by reference numeral 14, comprises a support member 33 (FIGS. 2 and 3) provided with a pair of diametrically opposing pins 35a which rotate in a corresponding seat 36 in the levers 24. Member 35 includes a centrally threaded bore in which a correspondingly threaded shaft 37 is capable of undergoing rotation. The lower end of shaft 37 is rigidly attached to the push rod 13 and its other end is provided with a screw head 38 which is torsionally rigid thereto, for example, by a splined coupling having a cap 39 which partially houses threaded shaft 37 and couples a corresponding cylindrical portion of support member 35, as can be seen clearly in FIG. 2. This coupling is provided with sufficient clearance to enable cap 39 to rotate on the support member 35.

A ring gear 40 is provided on the top of the cap 39, and forms part of a free wheel clutch indicated by 41 and shown in section in FIG. 4. Each tooth of this ring gear can, for example, be of triangular profile, as shown in FIG. 4, in which one side of each tooth is contained in a substantially radial plane. Clutch 41 is operatively coupled to a tubular member 42, the bottom of which surrounds the ring gear 40 and interconnects with a cylindrical portion 43 of the cap 39. The foregoing interconnection permits the tubular member 42 to rotate freely relative to cylindrical portion 43 of the cap 39 under certain conditions as will be described later.

Clutch 41 is also provided with a series of substantially radial push rods 44, each of which slides in a corresponding bore in the wall of the tubular member 42, and is urged against the ring gear 40 by a corresponding C-spring 45. The inner end of each push rod 44 possesses a tooth 44a having a triangular profile substantially corresponding to the space between two adjacent teeth of the ring gear 40 for insertion therein, as is best shown in conjunction with the lowest push rod in FIG. 4.

Since small changes in the spacing of the brake components are necessary to insure continuous adjustment by the device of the invention, in the clutch 41, the number of push rods 44 and teeth of ring gear 40 are selected to advance the gear a proportional increment of the circular pitch between adjacent teeth. This greatly reduces the number of teeth on gear 40 necessary to effect small adjustments, thereby eliminating expensive machining of the gear element which would otherwise be needed to provide effective clutch operation. It should be apparent to one skilled in the art that a number of push rods 44, other than as shown in FIG. 4, may be employed to accomplish small incremental rotation of the gear 40 in the manner intended as long as a similar relationship between the number of teeth and the push rods is used.

As shown in FIG. 4, four push rods 44 are arranged at 90° spacing around tubular member 42 for selective engagement with the teeth of gear 40, the number of which is not divisible by four. Thus, as shown, only a single push rod 44 can engage a space between adjacent teeth of gear 40 at any one time. In this manner the gear 40 may be advanced a distance which corresponds to one-fourth of the circular pitch of the teeth. Through such arrangement, each rod 44 will sequentially act in different phases to engage and advance a tooth as described, requiring all four rods 44 to have made such engagement in order to rotate the gear 40 through the distance of one circular pitch of the teeth. This arrangement between the push rods 44 and the gear 40 allows the rotational movement of the gear to be advanced one-fourth of the normal circular pitch.

The central part of the tubular member 42 is provided with a cylindrical bore into which a substantially spherical head 46 of a stem 47 is inserted. The upper end of stem 47 is pivotally secured by a pin 48 to the shank of a screw 49 axially slidable in a bushing 40, which is fixed by a threaded joint to the brake casing as shown in FIG. 2. The axial position of the shank 49 relative to bushing 50 can be adjusted by a pair of ring nuts 51, between which there is plate 52 provided with a radial tooth 53 (FIG. 3) for insertion into a corresponding axial groove 54 in the shank 49 to prevent its rotation relative to said casing. The plate 52 is affixed to the casing by any suitable technique such as, for example, by screws.

Stem 47 includes a lower enlarged portion from which a pair of diametrically opposing pins 55 extend in a normal direction from the stem, as is apparent from FIG. 2. Alternatively, pins 55 can be a single member (not shown) extending through stem 47 and projecting therefrom on diametrically opposite sides. Each of the pins cooperates with the edges 57, 58 of a corresponding helical slot 56 provided in the annular wall of the upper part of the tubular member 42. In one embodiment of the invention, the width of each slot 56 is substantially constant whereby edges 57, 58 are equally spaced along the axis of tubular member 42.

Figure 10:
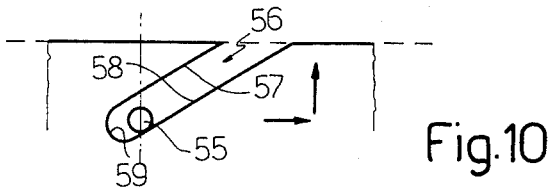
Figure 11:
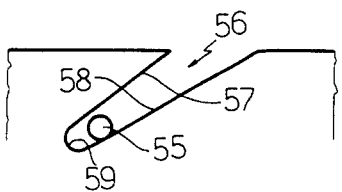
FIG. 11 is a diagrammatic illustration of a slot having an alternative configuration to the slot shown in FIGS. 6 to 10.

Referring to the diagrams in FIGS. 6 to 11, the edges 57 and 58 appear in a plan view as substantially parallel straight lines, joined at their lower end by a curved portion 59. The spaced distance between the edges forming slot 56 is selected to be greater than the diameter of the corresponding pin 55 as will be discussed later. In a modification of the invention, edges 57 and 58 are not parallel from a plan view as shown in FIG. 11, and instead converge downward toward each other terminating at curved portion 59.

In operation of the adjustment device of the invention under normal brake operating conditions, a predetermined radial clearance is provided between each of the bands 2 and 3 (FIG. 1) and the corresponding drum 1. This clearance is obtained by adjusting the lower position of the push rod 13 (FIG. 2) relative to the corresponding seat of the block 6 by rotating the threaded ring nuts 51 until the shank 49 has reached the required axial position relative to the brake casing to create such clearance.

If the brake pedal 18 is pressed under these conditions, then the cam 21 is caused to rotate in an anticlockwise direction viewing FIGS. 1 and 2, because of the mechanical coupling existing between the cam and pedal. During rotation of cam 21, its contour surface bears against the bushing 33 (FIGS. 2 and 3) so that the plates 32 rigid therewith are moved to the right viewing FIG. 5, along with push rod 31. Push rod 13 then actuates the servo brake 26 to effect a movement of member 28 toward the right in FIG. 2 to apply a force of predetermined value against the upper end of the levers 24 through plate 30 (FIG. 5) and rotate levers 24 in a clockwise direction about the pin 9 to lower clearance adjustment device 14. As a result of this movement, the push rod 13 tangentially urges the block 6, attached to band 2, toward block 5 of band 3. Since block 5 is retained in a substantially fixed position by the action of the projection 7 on the lever 8, both bands 2 and 3 are thereupon tightened about the drum 1.

During the lowering of the support member 35 (FIG. 2) of the clearance adjustment device, the pins 55 remain in a substantially fixed position, as they are connected to the brake casing by the stem 47, resulting in relative movement between each of the slots 56 and the pin 55. The edge 58 of each of the slots, which initially is in contact with a respective pin 55 (FIG. 6), separates from the pin, and then the other edge 57 is brought into contact therewith, as shown in FIG. 7. When this second contact has occurred, the push rod 13 is lowered a sufficient distance to bring the band portions 2 and 3 into contact with the drum 1 for a required braking operation. Thus, the constant distance between the edges 57 and 58 of each slot (measured in the direction of the vertical axis of the tubular member 42) must substantially coincide with the stroke of movement necessary for restoring the clearance between the bands and drum under normal operating conditions.

Figure 7:
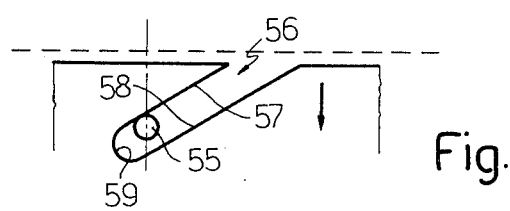
Figure 8:
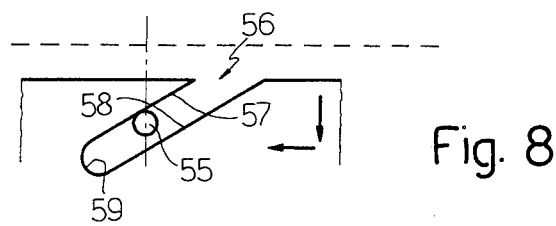
Figure 9:
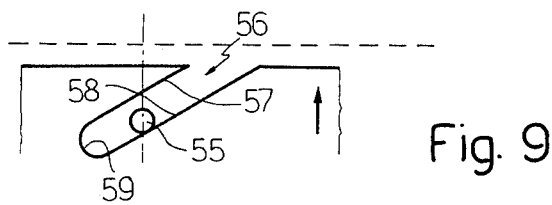

After wear has taken place between the bands and drum during operation, the foregoing initial clearance conditions are accordingly altered. In such a situation, edge 57 is brought into contact with the pin 55 as in FIG. 7 after lowering, even though the bands 2 and 3 will no longer effectively be moved into contact with the drum 1 during use. Instead the push rod 13 will continue to move downward and tubular member 42 is capable of increased lowering movement. During such increased movement pins 55 are already subject to contact with the edge 57 of the slot, and the tubular member 42 is rotated relative to the cap 39 in a clockwise direction as shown in FIG. 4. Such rotation continues until the bands 2 and 3 have reached their contact and braking position against the drum 1, so that no further lowering of the push rod 13 is possible. The relative position between each slot 56 and the respective pin 55 in such a situation is shown in FIG. 8. Rotation of tubular member 42, relative to cap 39, is permitted by the free wheel clutch 41 which is disposed therebetween. Rotation is achieved between ring gear 40 and the push rods 44 because the push rods are designed to move radially outward for insertion in a sequential snap-like motion between adjacent teeth of gear 40.

When the brake pedal 18 is released, the levers 24 rotate in the opposite direction than previously described and the support member 35 can again move upward. During the first part of this return stroke, the edge 57 separates from the corresponding pin 55 (FIG. 9), and the pin is brought into contact with the other edge 58. As the upward movement of the tubular member 42 continues, edge 58 cooperates with the pin 55 to rotate the tubular member 42 (as shown in FIG. 10) in a direction opposite to the previously described direction of rotation on the downward stroke. Because of this direction of rotation of tubular member 42, the clutch 41 is able to transmit motion between tubular member 42 and cap 39 for rotation of the cap. In view of rigid coupling of cap 39 to threaded member 37, this member is caused to rotate relative to the corresponding female thread of the support member 35, resulting in the threaded member being moved axially relative to support member 35 to lower the push rod 13. Since such axial and rotational movements are proportional to each other, it should be apparent that the angle of rotation imparted by the tubular member 42 on the threaded member 39, through clutch 41, equals the amount of movement necessary to return the push rod 13 into the initial correct clearance position prior to wear on the brake.

Figure 6:
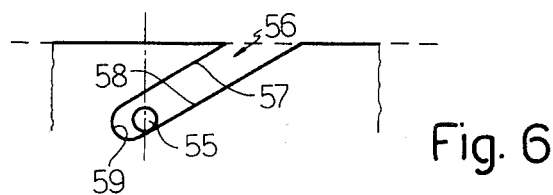
FIGS. 6 to 10 are diagrammatic illustrations of various operative positions of the slot and pin of the clearance adjustment device shown in FIG. 2.

At the end of the adjustment movement as described, the position of pin 55 relative to the slot is shown in FIG. 10, which corresponds to that of FIG. 6, illustrating the initial proper clearance configuration. It is therefore apparent that in any subsequent operating cycles of the brake, the component movements and automatic adjustments heretofore described will be effected.

In the modification of slot 56 as shown in FIG. 11, in which the edges 57 and 58 are not parallel to each other but instead converge, a predetermined initial clearance between the band and drum can be selected, which is proportional to the distance between two corresponding points on the edges 57 and 58 lying on the same vertical line in the diagrammatic representation of FIG. 11. An axial movement of the tubular member 42 equal to the difference between the distance between such two corresponding points on edges 57 and 58 along a vertical axis and the diameter of the pin 55 represents the distance required to move the bands 2 and 3 from their initial rest position to the position of contact with the drum 1. This distance is in fact equal to the necessary stroke to move the pin 55 from its contact with the edge 57 into contact with edge 58.

Using such a contour for the slot 56, the initial clearance condition can therefore be changed readily by varying the angular position of the tubular member 42 relative to the pins 55. Such adjustment can be effected by rotating the pins 55 and stem 46 through a predetermined rotational angle relative to the tubular member 42. To undergo this rotation, threaded ring nuts 51 and the locking plate 52 need only be turned the needed amount. It should be obvious to one skilled in the art that locking plate 52 can possess other suitable shape than as shown to enable the shank of screw 49 to be torsionally locked in any required position relative to the brake casing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention witout departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for automatically adjusting the clearance between braking components of a brake mechanism including actuation means displaceable to effect frictional contact between braking components moveable from a clearance position relative to each other to a contacting position in a braking mechanism, and wherein said actuation means includes a moveable member displaceable in a first direction to move the braking components from the clearance position to the contacting position and in a second direction from said contacting position to the clearance position, the device comprising linkage means coupling displacement of said moveablemember to said movement of said brake components, p1 said linkage means including a first adjustment means and a second adjustment means selectively coupled to permit relative motion therebetween in said first direction of movement of said moveable member and selectively coupled to transmit motion from the first adjustment means to the second adjustment means in said second direction of movement to automatically maintain said clearance position regardless of wear of the braking components, said first adjustment means including a tubular member mounted for selective rotation and having at least one helically oriented slot formed therein, said second adjustment means including a rotatably mounted threaded member rotatable upon selective movement of said tubular member in said second direction of movement and having at least one rigidly retained pin operatively coupled in said helically oriented slot of said tubular member, and clutch means operably connected to said first and second adjustment means permitting said relative motion in said first direction of movement of the moveable member and transmitting said motion in said second direction, said clutch means including a gear member having a plurality of gear teeth and a plurality of actuating rods circumferentially mounted about the periphery of said gear member to sequentially engage said gear teeth for transmitting motion from said first adjustment means to said second adjustment means when moved in said second direction of motion.

2. The device of claim 1 wherein said first and second adjustment means undergo relative motion in said first direction and transmit motion in said second direction when the clearance between the braking component exceeds an initial magnitude.

3. The device of claim 1 wherein said threaded member includes a rotatably mounted threaded shaft and a tubular cap member rigidly attached to the threaded shaft.

4. The device of claim 3 wherein said clutch is operatively coupled between said tubular member and said tubular cap member.

5. The device of claim 1 wherein said at least one pin undergoes movement in said at least one slot to permit relative rotation between said first and second adjustment means.

6. The device of claim 5 wherein the width of the slot exceeds the width of the pin.

7. The device of claim 6 wherein the difference between the width of the slot along an axis and the width of the pin is substantially proportional to the displacement of the actuation means during operation.

8. The device of claim 6 wherein the width along the length of the slot is constant.

9. The device of claim 6 wherein the width along the length of the slot is variable.

10. The device of claim 5 further including means for adjusting the relative position of the pin relative to the slot.

11. The device of claim 10 wherein said adjusting means is coupled to said at least one pin.

12. The device of claim 1 wherein said clutch means transmits said motion in said second direction through intermittent engagement of each of said rods with said gear member.

13. The device of claim 12 wherein said intermittent engagement transmits motion in said second direction for a distance proportional to the circular pitch between adjacent teeth divided by a numerical value equal to the number of said plurality of rods.

* * * * *